US012624764B2

(12) United States Patent
Leachman et al.

(10) Patent No.: US 12,624,764 B2
(45) Date of Patent: May 12, 2026

(54) STEM CONTROLLED VALVE FOR CRYOGENIC CONDITIONS

(71) Applicant: WASHINGTON STATE UNIVERSITY, Pullman, WA (US)

(72) Inventors: Jacob W. Leachman, Pullman, WA (US); Michael S. Wood, Pullman, WA (US)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 18/417,118

(22) Filed: Jan. 19, 2024

(65) Prior Publication Data

US 2024/0247730 A1 Jul. 25, 2024

Related U.S. Application Data

(60) Provisional application No. 63/480,571, filed on Jan. 19, 2023.

(51) Int. Cl.
F16K 1/38 (2006.01)

(52) U.S. Cl.
CPC ..................................... F16K 1/38 (2013.01)

(58) Field of Classification Search
CPC ... F16K 1/38; F16K 1/385; F16K 1/46; F16K 1/465; F16K 1/44; F16K 1/443; F16K 47/04; F16K 3/246
USPC ........ 277/549, 365, 361, 310, 311, 309, 307
See application file for complete search history.

(56) References Cited

U.S. PATENT DOCUMENTS

| | | | | | |
|---|---|---|---|---|---|
| 1,645,601 | A | * | 10/1927 | Lee ......................... | F16K 47/04 |
| | | | | | 251/359 |
| 3,485,474 | A | * | 12/1969 | Baumann ................ | F16K 47/04 |
| | | | | | 251/121 |
| 3,515,370 | A | * | 6/1970 | Ung ........................ | F16K 47/04 |
| | | | | | 251/120 |
| 4,450,718 | A | * | 5/1984 | Hartemink ................ | F15D 1/04 |
| | | | | | 73/202 |

(Continued)

FOREIGN PATENT DOCUMENTS

| | | | | | |
|---|---|---|---|---|---|
| EP | 0412229 | A1 | * | 2/1991 | ........... F16K 1/2285 |
| FR | 1337850 | A | * | 9/1963 | ............... F16K 1/52 |
| GB | 1042924 | A | * | 9/1966 | |

OTHER PUBLICATIONS

Machine English translation of FR-1337850-A (Year: 2025).*
Machine English translation of EP-0412229-A1 (Year: 2025).*

*Primary Examiner* — Hailey K. Do
(74) *Attorney, Agent, or Firm* — WCF IP

(57) ABSTRACT

A stem controlled valve uses a stack which includes a plurality of spacing discs and a plurality of sealing discs, where the spacing discs are interdigitated between the sealing discs, or uses a monolithic plug or inner wall of a valve seat with spaced apart extension areas. The sealing discs or extension areas are slightly larger in diameter than a valve seat they fit within or plug wall they fit against such that they elastically deform against the inner wall of the valve seat or the outer wall of the plug. For sealing in cryogenic applications, at least the outer portions of the sealing discs, or the extension areas in the case of a monolithic plug and inner seat wall are pre-stressed to generate void spaces that govern deformation and cryogenic pliability of the single or groups of sealing discs.

16 Claims, 6 Drawing Sheets

(56) References Cited

U.S. PATENT DOCUMENTS

| | | | | |
|---|---|---|---|---|
| 4,504,040 | A * | 3/1985 | Spils | F16K 47/04 |
| | | | | 251/127 |
| 4,549,718 | A * | 10/1985 | Seger | F16K 47/04 |
| | | | | 251/123 |
| 10,240,537 | B2 * | 3/2019 | Cadman | F16K 15/148 |
| 10,247,318 | B2 * | 4/2019 | Veto | F16K 1/443 |

* cited by examiner

STEM CONTROLLED VALVE FOR CRYOGENIC CONDITIONS

CROSS-REFERENCE TO RELATED APPLICATIONS

This application claims priority to U.S. Ser. No. 63/480,571 filed Jan. 19, 2023, and the complete contents thereof is herein incorporated by reference.

FIELD OF THE INVENTION

The embodiments herein are directed to a stem controlled valve utilizing a disc configuration with a plurality of sealing discs and spacer discs, in which each spacer disc allows the sealing disc below it and/or above it to elastically deform without fracturing. In particular, the stem control valve is applicable to structures such as, for example, a valve and a plug operating at cryogenic conditions.

BACKGROUND OF THE INVENTION

Pipes and valves can run in an above ground and/or underground network to supply fluids like water and gas to homes and businesses. Because of the nature of where pipes and valves exist, there is a risk of damage from the elements. If pipes and valves are left open and unsecured, dirt, debris, rain, snow, salt and more can settle into pipes and then corrode the pipes. As pipes corrode, major problems may result, such as a burst water main or a gas leak. Pipes and valves above ground can be exposed to dust particulates and other foreign object debris in the air which can enter the pipes through intake or exhaust vents, and can lead to similar problems with below ground pipes. Additional problems that arise include leakages such as valve leakage, internal leakage, and external leakage.

Valve leakage refers to flow through a valve which is set in the 'off' state. The importance of valve leakage depends on what the valve is controlling. In the United States, the American National Standards Institute specifies six different leakage classes for control valves, with "leakage" defined in terms of the full open valve capacity: Class I, or 'dust-tight' valves, are intended to work without much leakage, but are not tested for leakage loss; Class II valves have no more than 0.5% leakage with 50 psi (or less if operating pressure is less) of air pressure at the operating temperature; Class III valves have no more than 0.1% leakage under these same conditions as specified for Class II valves (this may require soft valve seats, or lapped metal surfaces); Class IV valves have no more than 0.01% leakage under the same conditions specified for Class II valves (this type of performance tends to require multiple graphite piston rings or a single Teflon piston ring, and lapped metal seats); Class V valves leak less than $5*10^{-12}$ cubic meters, per second, per bar of pressure differential, per millimeter of port diameter, of water when tested at the service pressure; Class VI valves are slightly different from Class V valves in that they are required (at 50 psi or operating pressure, whichever is less) to have less than a specified leakage rate in milliliters of air per minute as shown in Table 1 below.

TABLE 1

| Size | Leakage | |
| | mL/min | Bubbles/Min |
| --- | --- | --- |
| 1 inch | 0.15 | 1 |

TABLE 1-continued

| Size | Leakage | |
| | mL/min | Bubbles/Min |
| --- | --- | --- |
| 1.5 inch | 0.3 | 2 |
| 2 inches | 0.45 | 3 |
| 2.5 inch | 0.6 | 4 |
| 3 inches | 0.9 | 6 |
| 4 inches | 1.7 | 11 |
| 6 inches | 4 | 27 |
| 8 inches | 6.75 | 45 |
| 10 inches | 9 | 63 |
| 12 inches | 11.5 | 81 |

Valve Leakage rate for a Pressure Relief Valve, (PRV) is determined by the size of the orifice diameter, and the size of the valve, according to the American Petroleum Institute standard API 527. 'Soft Seated' PRV's are to be tested on Air or nitrogen near ambient temperature and are to exhibit no leakage for 1 minute at either 90%, or 5 psig below, of lifting pressure. Table 2 gives the leakage rate values for PRV's for metal-to-metal seated PRV's.

TABLE 2

| Manufacturer's orifice area (in²) | Allowable Bubbles/min |
| --- | --- |
| 0.47 and smaller | 40 |
| 0.71 and smaller | 40 |
| 1.264 | 20 |

Cryogenic valves still have some problems remaining to be solved, including without limitation internal leakage and external leakage. There are several reasons for the internal leakage of cryogenic valves. One is the sealed auxiliary deforming at low temperature. The phase transition of valve materials, which is formed by the decrease of the medium temperature, changes the volume of the cryogenic valve, and causes the warping deformation of the sealing surface. Another is hysteresis in the subassemblies after initial testing where the seat or spring can become misaligned preventing a tight seal. Yet another reason is seal embrittlement and wear of the seal and seat contact area caused by low medium temperature and standard use.

Thus, cryogenic valves tend to have poor sealing performance at low temperature. In a low-temperature test, the cryogenic valve DN250, whose media are liquid nitrogen (−196° C.) and whose disc material is $1Cr18Ni9Ti$ (without low-temperature treatment), it was found that the warping deformation of the valve's sealing surface can reach about 0.12 mm. This deformation is the main reason for the internal leakage for metal-to-metal seated valves.

In external leakage of the cryogenic valves, the cryogenic valve can leak when they are connected to the pipeline with a flanged connection and a gasket, and where the connecting bolt and fittings are not contracted at the same time at the low temperature. Thus, the flanged connection should preferably be changed to a welded connection for preventing leakage at low temperature. In addition, there may be leakage between the valve stem and the stuffing box. At low temperature, since the cooling contraction can cause leakage of the cryogenic valve and then freeze the valve stem, the cryogenic valve will not be opened as normal. Therefore, the cryogenic valve keeps a certain space to seal at either the normal or low temperature by adopting self-sealing structures.

SUMMARY

It is an object of the invention to provide a stem controlled valve that allows for rotation and translation while actuating the valve.

It is another object of the invention to provide a stem controlled valve that is suitable for cryogenic applications. In particular, the invention provides a methodology for processing the seal material in a manner which generates void spacing in the material which will govern the amount of deformation required for sealing applications.

According to an embodiment of the invention, a stem controlled valve includes a seal that is formed using a plurality of sealing discs and a plurality of spacer discs. The diameters of the spacer discs are less than the diameter of the sealing discs such that the outer edges of the sealing discs extend beyond the outer edges of the spacer discs. The assemblage is configured such that the plurality of sealing discs are slightly larger in diameter than a valve seat in which the seal is to be created, and where the sealing discs are elastically deformed under mechanical pressure, and form a seal against the inner wall of the valve seat in the area beyond the outer diameter spacer discs. In variations on this embodiment, the wall of the valve seat can be cylindrical, conical, or conically rounded.

In another embodiment of the invention, a stem controlled valve includes a seal that is formed by a stacked array of a plurality of sealing discs and a plurality of spacer discs where the sealing discs have a relatively smaller inner diameter opening than the inner diameter opening of the spacer discs. A plug, which can be conical or cylindrical, and which has an outer diameter larger than the inner diameter opening of the sealing discs, is used to create the cryogenic seal by forcing portions of the inner diameter opening of the sealing discs that extend beyond the inner diameter opening of the spacer discs to elastically deform against the outer wall of the plug.

In yet another embodiment of the invention, a stem controlled valve includes a seal that is formed by either a monolithically formed plug or a monolithically formed valve wall which has extension areas formed into the plug or wall which are spaced apart from one another and which contact the surface of the wall, in the case of a monolithic plug, or contact the surface of the plug, in the case of a monolithic wall. The extension areas are configured to elastically deform under mechanical pressure and form a seal against the plug or wall in the area beyond the outer edge (e.g., circumference) of the extension areas. In variations on this embodiment, the plug or wall surface can be cylindrical, conical or conically rounded.

DESCRIPTION

Figure 1:
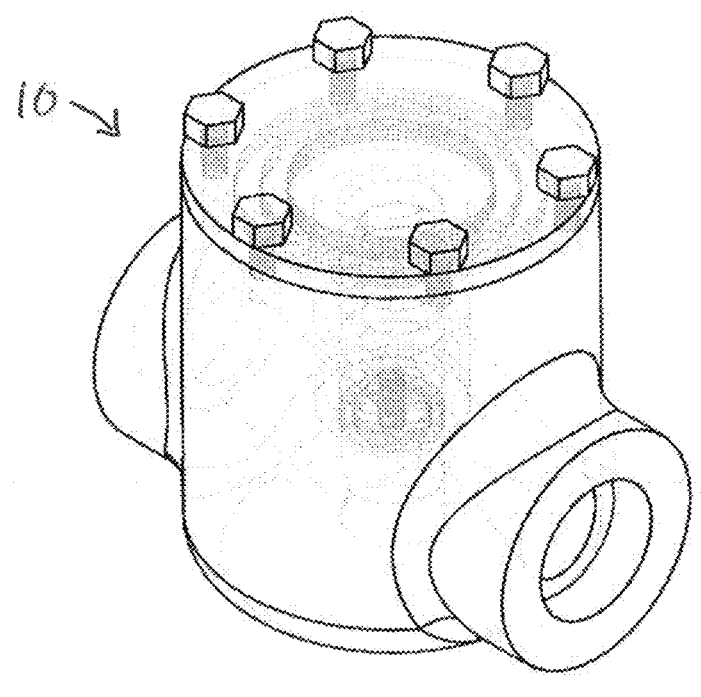
FIG. 1 is an isometric view of check valve utilizing seal technology in both the plug and bonnet.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

SPECIFIC DESCRIPTION

In a first example embodiment disclosed herein, a structure such as, a chamber/seat includes a plurality of chamber discs of alternating differential diameters into which another structure, such as for example, a plug, a ball, a disk, or other is inserted. The chamber discs then elastically deform to the geometry of the inserted structure creating a seal. In particular, chamber disc sizes vary in materials, as well as in inside diameter, outside diameter, and thickness.

In a second example embodiment disclosed herein, a plug with a set of sealing discs and a set of spacer discs is concentrically inserted into a chamber/seat of smaller diameter. The set of spacer discs are smaller in relation to the set of larger sealing disks and these two sets of discs are held together via for example, an adhesive, a pin, a screw, etc. While inserting, the discs of the plug will not break but elastically deform to the geometry of the surface of the chamber/seat, creating a seal. All discs are engineered to prevent plastic deformation.

The example method of operation preventing the deformation of the assembly and creating a seal is disclosed herein as a sealing paradigm. The sealing paradigm is utilized in applications including but not limited to gaskets, valves such as, for example, safety valves, plug valves, butterfly valves, check valves and block valves, valve seats, quick connects, union fittings, nipples, bayonet fittings, pipe fittings, etc. More particularly, such a sealing paradigm assembly is suitable for cryogenic temperatures.

A gasket is a mechanical seal which fills the space between two or more mating surfaces, generally to prevent leakage from, or into, the joined objects while under compression. It is a deformable material that is used to create a static seal and maintain that seal under various operating conditions in a mechanical assembly. A valve is a device or natural object that regulates, directs, or controls the flow of a fluid (gases, liquids, fluidized solids, or slurries) by opening, closing, or partially obstructing various passageways. Valves are technically fittings but are usually discussed as a separate category.

A valve seat is the surface against which a valve rests during the portion of the operating cycle when the valve is closed. The valve seat is an important component of valve in that if it is improperly positioned, oriented, formed during manufacturing, or obstructed by foreign object debris valve leakage will occur which will adversely affect the system in which the valve is utilized. As the closure member of the valve, plugs or discs are connected to the stem which is slid or screwed up or down to throttle the flow.

A thin disc, or "sealing disc" is disclosed herein which follows the concept that when a thin, elastic polymer with a low modulus of elasticity is subjected to cryogenic conditions it is observed not to plastically deform. In the embodiments herein, the thin disc is concentrically inserted into a smaller diameter valve seat at cryogenic temperatures resulting in the disc to form to the surface of the seat without breaking. By thin, we mean that the disc may have a thickness of 0.1 mm to 1 cm or larger (as discussed below), for example, depending on the application.

When this thin disc is stacked in an assembly with the same diameter, it thermally welds itself together, increasing the thickness and allowing the discs to crack. In order to combat this issue of cracking, a thicker disc, or "spacer disc" of smaller diameter is disclosed herein which is not intended to move or deform, instead allows for the sealing disc below it and/or above it to plastically deform without cracking. This plastic deformation of the sealing disc occurs at the edges which extend beyond the smaller diameter of the spacer disc. A stack of sealing discs interdigitated with spacer discs are held together by screws, pins, etc. or by the opposing mating surface/seat. Force of the elastic deformation against the mating surface in series, is projected to create a Class VI 'Bubble Tight' shutoff. The discs in series also prevent leak paths created by debris and thermal contraction of the valve body helps make the seal tighter.

A variation on the concept of a stacked array of sealing discs and spacer discs is to manufacture the sealing plug, or the plug wall, with spaced apart extension areas which have a circumference designed to contact and deform against the plug or valve seat wall.

The embodiments disclosed herein replace the conventional conical or spherical valve seat (typically made of Teflon or Kel-F) in cryogenic valves with a stack of polymeric films in the shape of washers, the washers flex at cryogenic temperatures allowing the valve seat to flex around foreign objects or debris (FOD) that could prevent the valve seat from closing. Cryogenic valve resealing is a major issue affecting the entire cryogenics industry.

For stem controlled valves that operate in cryogenic temperatures, untreated seal materials described below will not maintain sufficient pliability at cryogenic operating temperatures to allow the amount of deformation required for sealing applications. Without preparing seal materials by pre-stressing them, they will become too brittle once introduced to cryogenic temperatures, and fail to function due to fracture or shattering upon attempted deformation. Materials described herein for seal flanges (or other seal extension portions of monolithic designs) are treated by plastically deforming polymers at room temperature (20° C.±20) to create void spaces in the material. Deformation can be accomplished by pressing seals against valve mating surfaces or otherwise bending in same direction that seals are designed to flex in operation. Depending on design configuration and material dimensions, pre-stressing can include cycling valves (or otherwise deforming materials) multiple times at room temperature.

For one example configuration, stacked PTFE seals (alternating sealing discs with spacers), have been pre-stressed by inserting the stacked PTFE seals into the valve, for example at room temperature, then tightening a set screw past the valve set pressure, then loosening the set screw until reaching the set pressure. The valve was then actuated 10-15 times before testing in LN2.

Pre-stressing can be evident through white color change in plastics—"stress-whitening"—prior to cooling to cryogenic operating temperatures. Following pre-stressing, overlapping layers of void spaces interleaved with thin sheets or fibers of solid material allow polymer chains additional mobility to move and flex while cold without breaking, akin to the flexibility of stacked sheets of paper versus a solid board. Beyond visual confirmation through stress-whitening of materials, specimens from a particular seal design can be confirmed to contain void spaces through microscopy of cross sections. Pre-stressing can be localized to a hinge or crease region, and it is noted that tensile specimens plastically deformed while warm to produce visual necking and opacity will still break in non-plastically deformed areas when cold, despite the increased cross-sectional area compared to the necked down (i.e., pre-stressed) section.

The example embodiments disclosed herein operate in different example methods of operation including but not limited to a plug assembly to be pressed into a seat to create a seal; a seat assembly where a plug/ball/disc etc. is pressed into the seat to create the seal; a gasket assembly where there's mating surfaces with extrusions that are of smaller diameter than the discs to create the seal. Disc sizes (or extension areas on a monolithic design) and materials are to vary in inside diameter, outside diameter, and thickness depending on the size of the valve.

Both inside and outside diameters vary in a range from 0.1 inches up to 20 inches. Thickness varies in a range from 0.001 inches up to 1 inch. Materials utilized herein for making either or both the sealing discs and the spacing discs are preferably with low elastic modulus such as but not limited to polymers, PTFE, FEP, PFA, ETFE, Teflon-S, Teflon, Kel-F, etc. The bend radius varies depending on the engineered formula. The different example methods of manufacturing the discs include but are not limited to laser cut, conventional machining, water jet, injection mold, vacuum form, and others.

All stem controlled valves require a seal that allows the stem to rotate and translate while actuating the valve. Valve packing is what is referred to as the seal used to prevent the process fluid inside of a valve from leaking external to the valve while the stem is in the process of rotating and translating. In cryogenic service, valve packing is removed from the cryogenic fluid via a stand-off referred to as an extended bonnet. This keeps the valve packing warm and prevents cold brittle fracture from the friction the packing is experiencing during dynamic movement.

This technology has particular application in the use of dynamic sealing in which a surface, or surfaces, is experiencing translation, rotations, and/or oscillations. An example of usage is valve packing applications. Where a processed disc(s) is inserted into a chamber with the outside surface of the disc(s) is in contact with an outer, stationary, wall. The inside surface of the disc(s) is in contact with a shaft that will both rotate and translate. The disc(s) will conform to the shaft diameter, preventing leakage of any gas or fluid across the cross section of the disc(s).

Particular embodiments allow valve packing to be in direct contact with cryogenic liquid. This removes the need for extended bonnets to remove the seal from the cryogenic liquid therefore removing the weight, manufacturing cost, and materials cost associated with the design. This invention could as well as apply to any dynamic application in cryogenics such as cryostats, pumps, turbines, etc.

Figure 2:
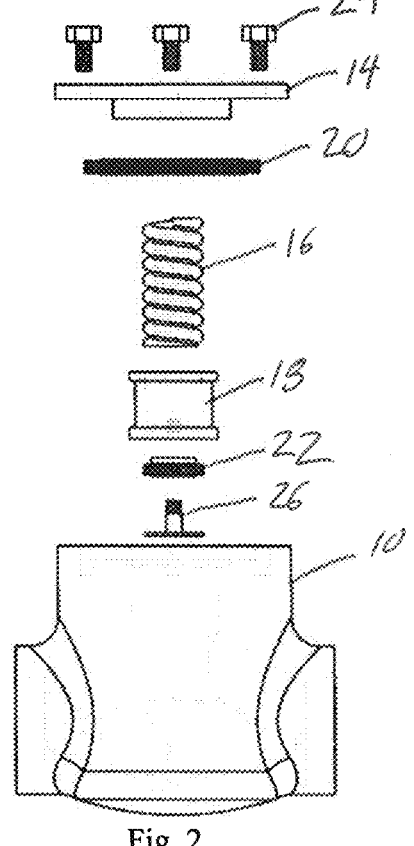
FIG. 2 is an exploded view of check valve utilizing seal technology in both the plug and bonnet. The valve comprises bonnet screws, bonnet, bonnet seal, spring, carriage, plug seal, plug retainer, and valve body.
Figures 3A, 3B:
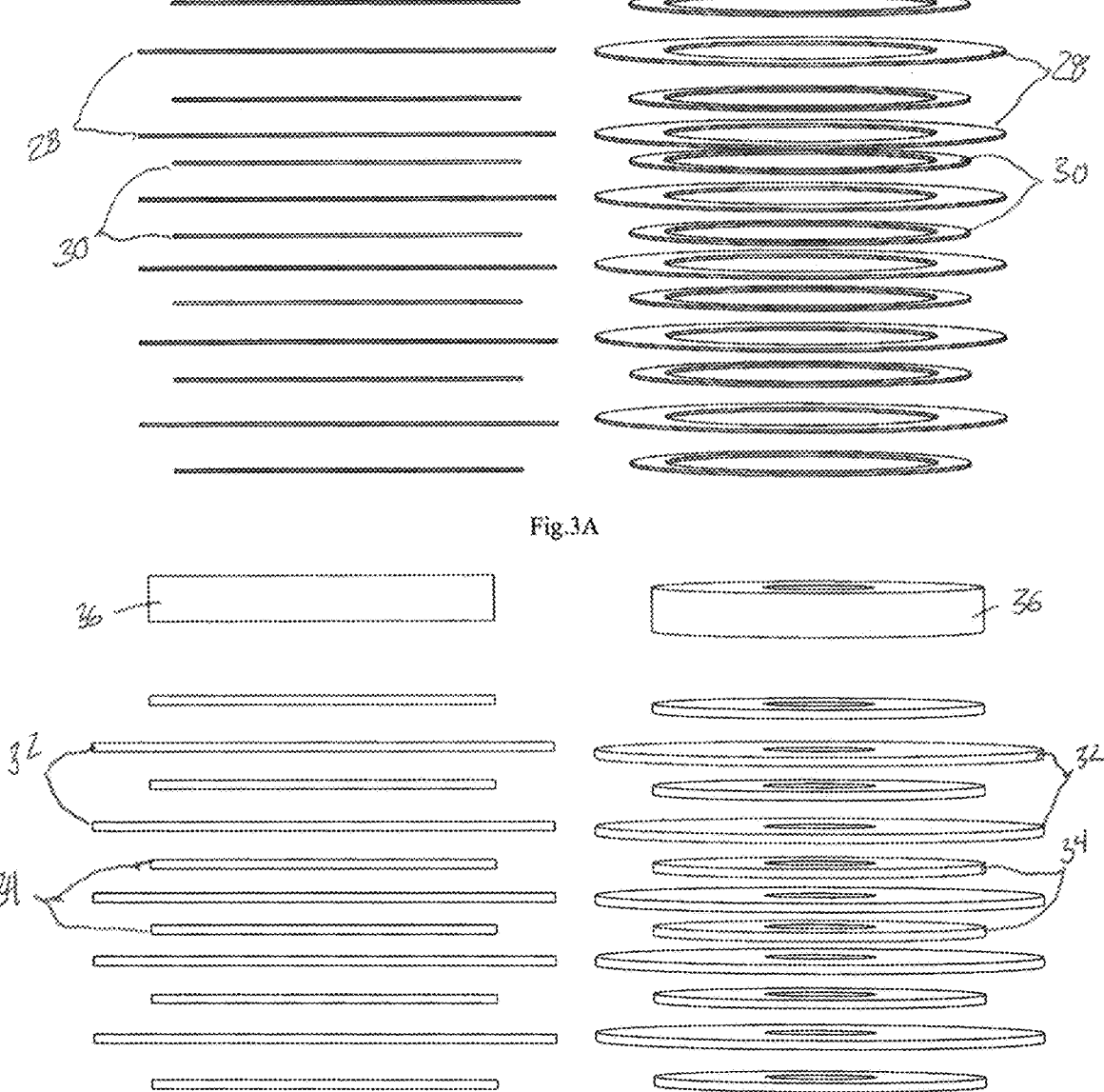
FIG. 3A is a side and an isometric view of a bonnet seal comprised of spacing discs and sealing discs.
FIG. 3B is a side and isometric view of a plug seal comprised of spacing discs, sealing discs, and a top press-fit disc.
Figure 4:
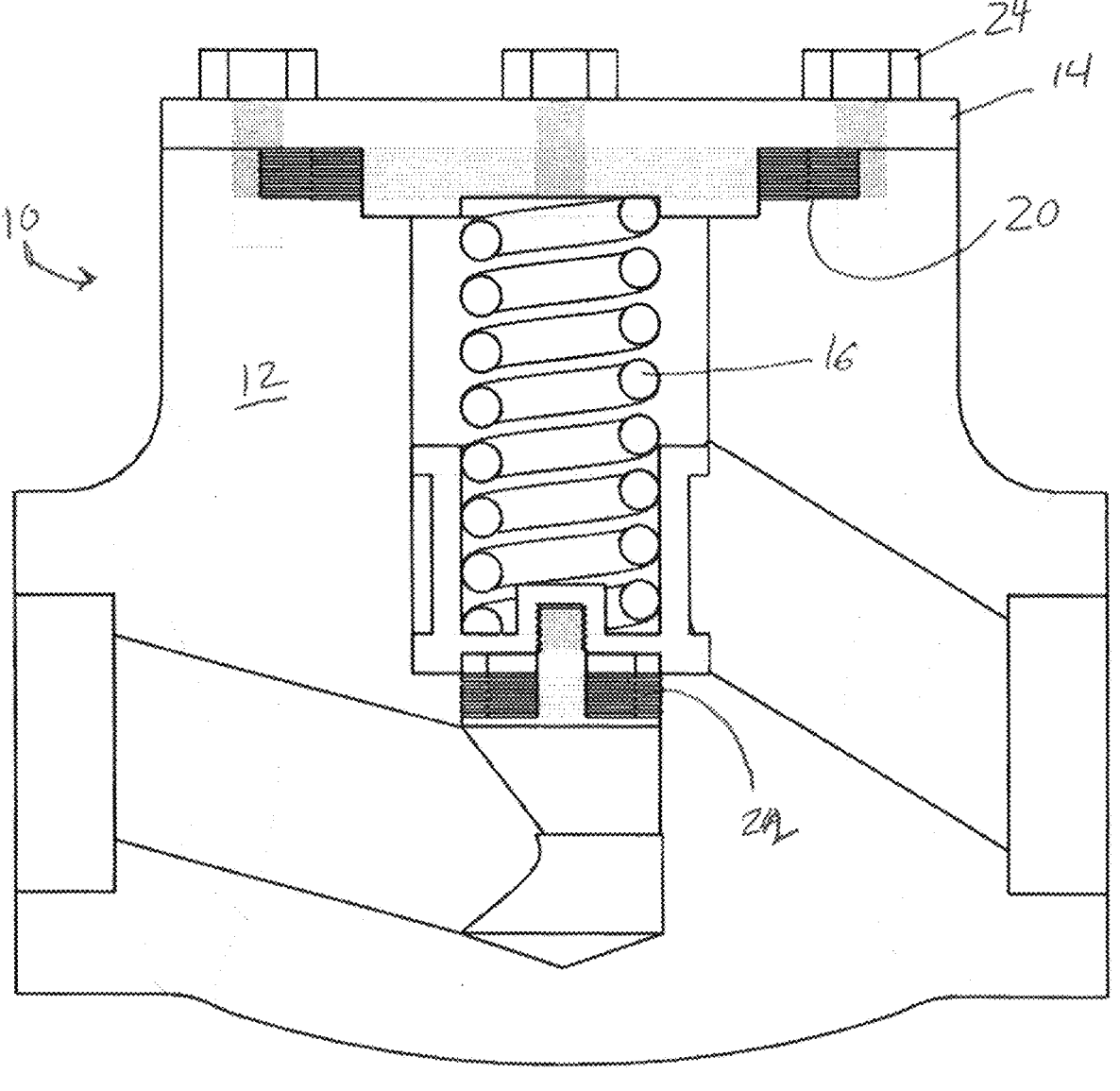
FIG. 4 is a section view of a fully assembled valve.

With reference to FIGS. 1, 2, 3A, 3B, and 4, there is shown, as an example, a check valve 10 as a particular embodiment a stem controlled valve according to the present invention. The stem controlled valve may be fabricated and configured for cryogenic applications. The check valve 10 has a body 12 and a bonnet 14, as well as a spring 16 biased plug assembly 18. Other valve designs can include additional and/or different components. A focus of the invention is the seal, which in this case is provided both by a bonnet gasket 20 and a plug gasket 22. As discussed above, these gaskets 20 and 22 may be processed to generate void space in material that will govern amount of deformation required for scaling applications involving cryogenic fluids. FIG. 2 highlights how the parts of the check valve 10 fit together. The bonnet 14 may be secured with one or more screws 24, and a plug 26 may be used to secure the plug gasket 22 to the plug 18. FIG. 4 shows that the bonnet gasket 20 and the plug gasket 22 both fit within different seats within the check valve.

FIG. 3A shows the bonnet seal, referred to as a bonnet gasket 20, may be formed from a stack of a plurality of sealing discs 28 and spacer discs 30. Similarly, and with reference to FIG. 3B, the plug seal, referred to as a plug gasket 22, may be formed from a plurality of sealing discs 32 and spacer discs 34. The plug gasket may also include a cap 36 which is joinable to the plug 26. In both FIGS. 3A and 3B, for exemplary purposes for this check valve 10 example, the scaling discs 28 or 32 have a relatively larger outer diameter than the spacer discs 30 and 34. Comparing FIG. 4 with FIG. 3A, it should be understood that the outer diameter of the sealing discs 28 is also larger than the inner diameter of the seat in the check valve body 12, and the outer diameter of the spacer discs 30 is smaller than the inner diameter of the seat in the check valve body 12. In this way, when the screws 24 are tightened on the bonnet 14, the portion of the sealing discs 28 which extend beyond the outer diameter of the spacer discs 30 contact the inner diameter of the seat in the check valve and plastically deform. Similarly, while not shown in FIG. 3A, it should be recognized with reference to FIG. 4, that the sealing discs 28 and spacer discs 30 each have a pass through hole which accommodates a cylindrical portion of the bonnet 14 bottom. Like the above description, the inner diameter of the pass through hole in the scaling discs 28 is relatively smaller than the outer diameter of the cylindrical portion of the bonnet 14 bottom, and the inner diameter of the pass through hole in the sealing discs 28 is relatively larger than the inner diameter of the pass through hole in the spacer discs 30. In this way, the portion of the sealing discs 28 which extends beyond the inner diameter of the spacer discs can contact the outer surface of the bonnet 14 bottom, and plastically deform there against on tightening the screws 24.

FIG. 3B is similar to FIG. 3A, in that the sealing discs 32 have an outer diameter that is larger than the outer diameter of the spacer discs 34. In addition, the outer diameter of the scaling discs is slightly larger than the seat in the valve body where the plug 18 abuts against. In this way, the portion of the sealing discs 32 which extends beyond the outer diameter of the spacer discs 34 abuts against the seat in the valve 12 and plastically deforms there against when flow through the valve is to be stopped.

The distances that the sealing discs 28 and 32 extend beyond the outer diameter of the spacer discs 30 and 34 can vary depending on the application. Generally, the distance is preferably ranges from 1 nm to 3 cm. The same is true for the through hole which seals against the bonnet 14 bottom. In addition, the outer diameter of the sealing discs 28 and 32 is generally 1 nm to 1 cm larger than the diameter of the seat in the check valve body 12 in which they sit (it being understood that these size differences can vary considerably depending on the application). The chief requirement in the embodiment shown in FIGS. 1, 2, 3A, 3B, and 4 is that that the outer diameter of the sealing discs 28 and 32 is large enough to contact and abut against the valve seats in the valve body 12, but not so large that the sealing valves cannot be pushed into the seat and plasticly deform against the seat. The same would also be true for the inner diameter through passages in the sealing discs 28 relative to the outer diameter of the bonnet 14 bottom.

As discussed above, the bonnet gasket 20 and plug gasket 22 are stem controlled valves that allow the stem to rotate and translate while actuating the valve (e.g., plug gasket 22). While bonnet gasket 20 does not actuate the valve it can be viewed as a stem controlled valve as it must be able to allow the bonnet to rotate and translate so that it seats correctly when the screws 24 are applied. The plug gasket 22 provides a seal used to prevent the process fluid inside of a valve from leaking external to the valve while the stem is in the process of rotating and translating. As illustrated in FIG. 4, for cryogenic service, there is an extended bonnet in which the bonnet gasket 20 is location for removing valve from the cryogenic fluid. This keeps the valve packing warm and prevents cold brittle fracture from the friction the packing is experiencing during dynamic movement.

While FIGS. 3A and 3B show a single spacer disc 30 and 34 between each pair of spacer discs 28 and 32, respectively, it should be recognized that one or more spacer discs 30 can be abutted adjacent each other between either a single or groups of one or more sealing discs 28 and 32. The chief requirement is that there be a plurality of regions in the stack where one or more spacer discs space apart pairs of either one or groups of sealing discs. In this way, the plastic deformations occur at multiple locations against the valve seat and serve to tightly block leakage at the valve seat or plug when a mechanical force is used to close the valve.

Figures 5, 5A:
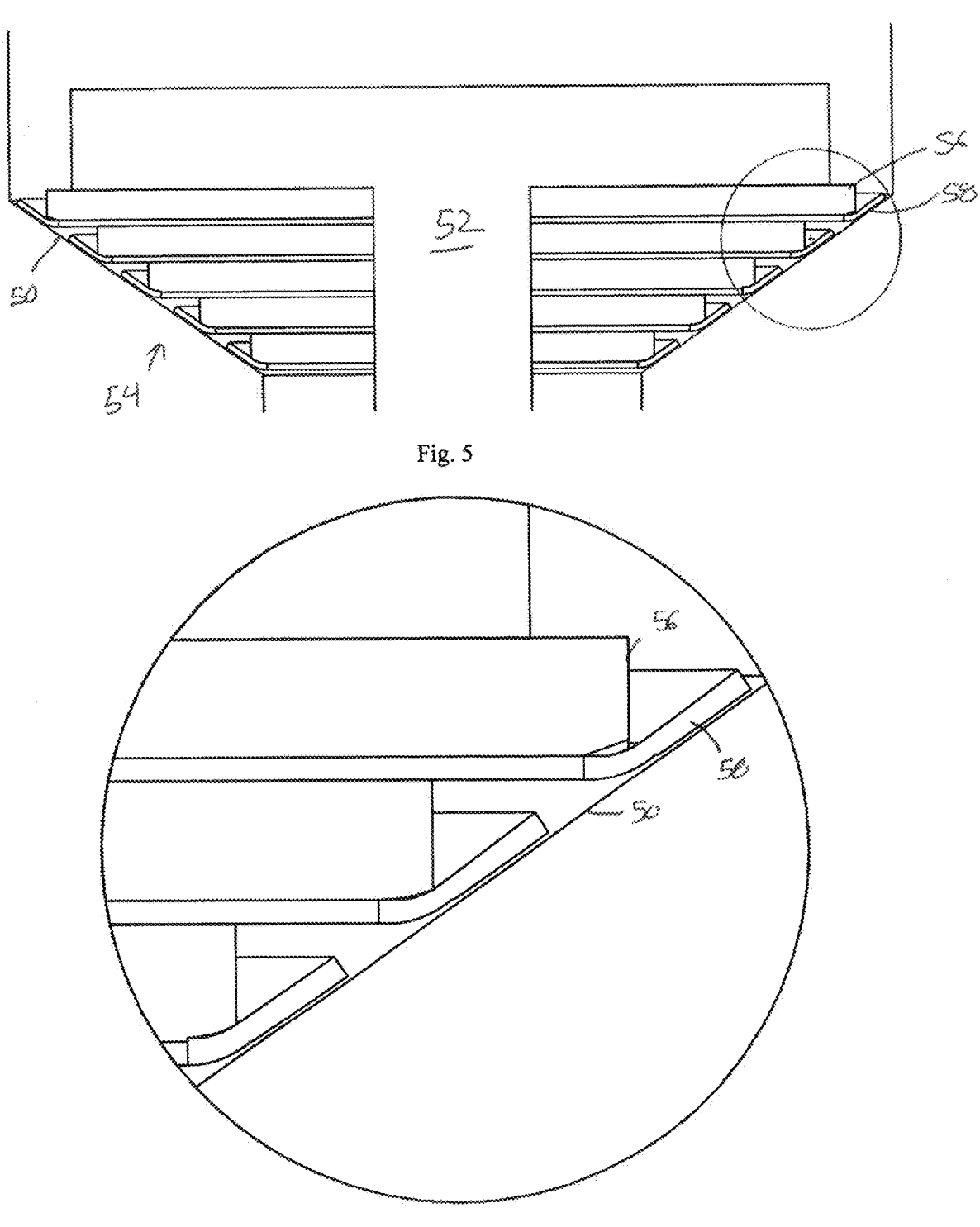
FIG. 5 is a cross-sectional view of an exemplary plug seal configuration with sealing discs, held in place by valve stem, conformed to the surface of the seat.
FIG. 5A is an enlarged view of the plug assembly of FIG. 5 illustrating pre-processed sealing discs with void spaces to conform to seat in cryogenic service.
Figure 6:
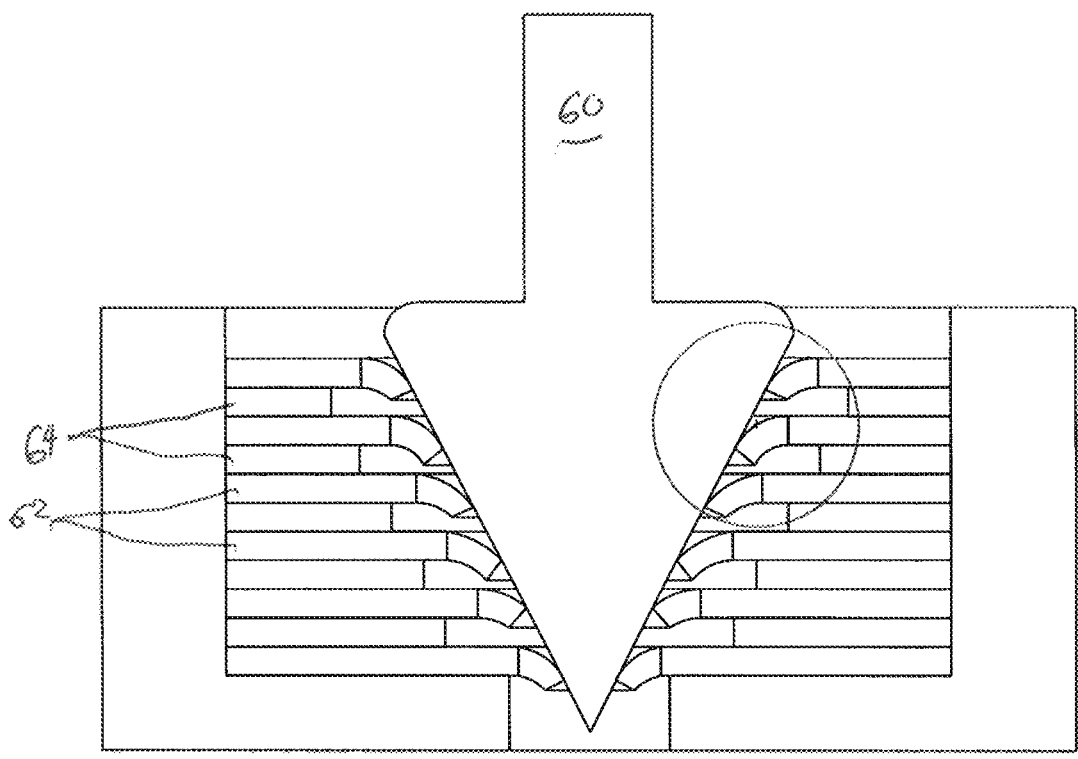
FIG. 6 is a cross-sectional view of an exemplary seat seal configuration with sealing discs, held in place by set screw, conformed to the surface of the plug.
Figure 6A:
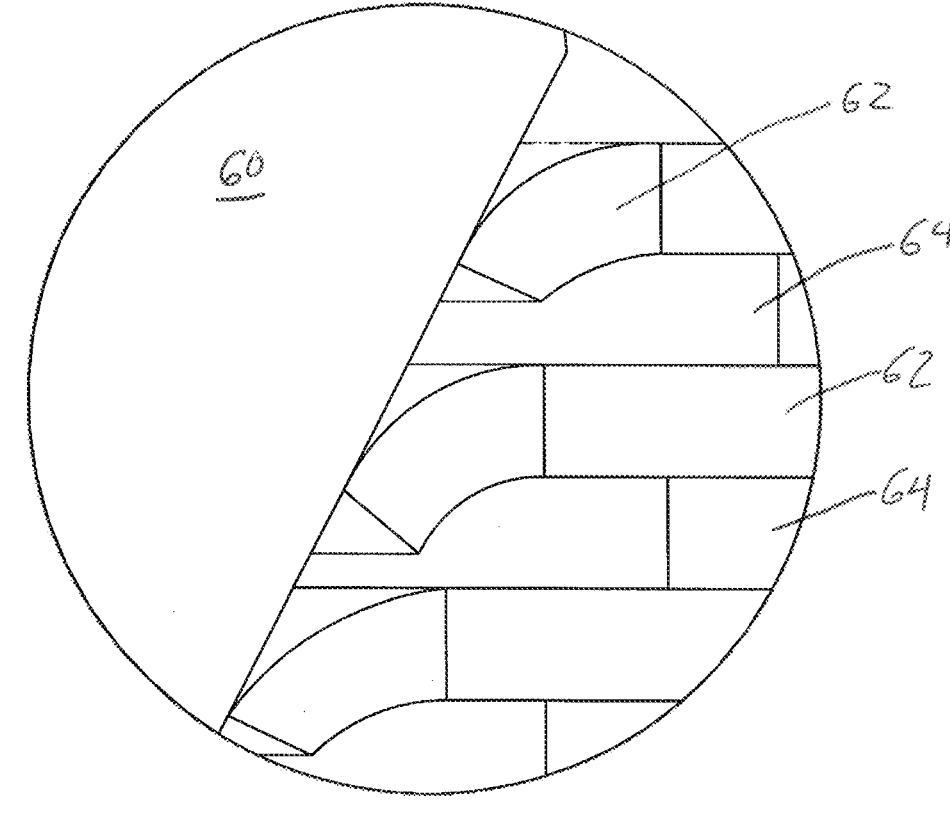
FIG. 6A is an enlarged view of the plug assembly of FIG. 6 illustrating pre-processed sealing discs with void spaces to conform to plug in cryogenic service.
Figures 7A, 7B, 7C:
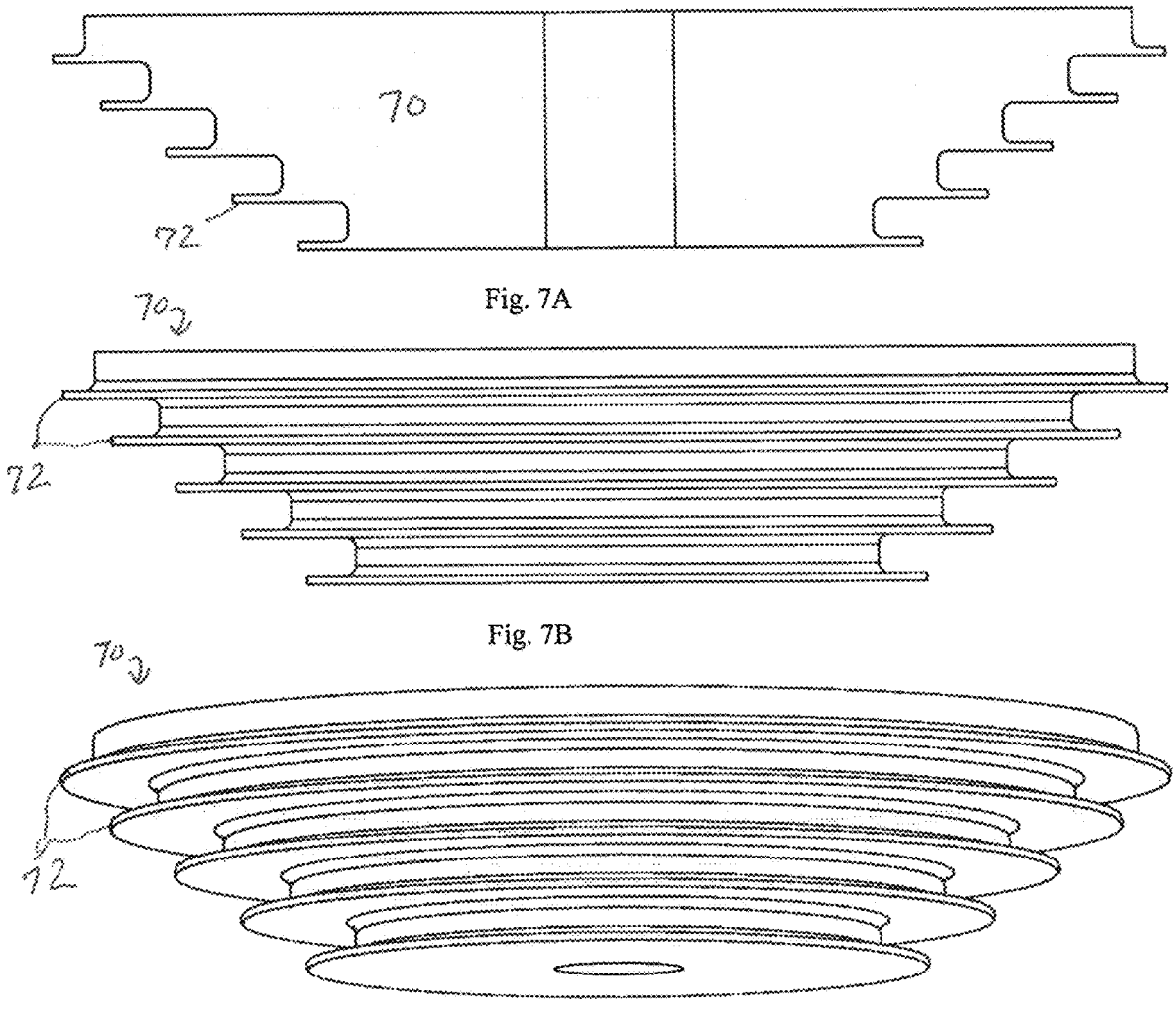
FIGS. 7A-7C are, respectively, cross-sectional, side, and isometric views of an exemplary monolithic plug with spaced apart extension areas.

FIGS. 5, 5A, 6, and 6A show by example how the stem controlled valve may be used against a conical or rounded conical seat (FIGS. 5 and 5A) or against a conical plug (FIGS. 6 and 6A). In FIGS. 5 and 5A, the valve seat 50 is either conical or rounded conical. A plug 52 passes through holes in a stack 54 which includes both spacer discs 56 and sealing discs 58. FIG. 5A shows plastic deformation of the sealing discs 58 against the valve seat 50 in the area where the outer diameter of the sealing discs 58 extend beyond the outer diameter of the spacer disc 56. As discussed above, the outer diameter of the sealing discs 58 is larger than the inner diameter of the valve seat 50, at least at the location where the sealing discs 58 contact and deform against the valve seat 50 (e.g., the outer diameters of the sealing discs 58 can vary depending on the shape of the valve seat, and the same is true for the spacer discs 56.

Similarly, as is shown in FIGS. 6 and 6A, when a stem controlled valve has a moveable plug 60, and where the plug 60 has a conical shape as an example, the inner diameter of the sealing discs 62 is relatively larger than the inner diameter of the spacer discs 64. In this way, the area of the sealing discs 62 which extends beyond the inner diameter of the spacer discs 64 can abut firmly against and plastically deform at the outer diameter of the plug 60.

In another embodiment, instead of a stacked array of sealing discs and spacer discs, the plug 70 (or valve seat wall) may be formed as a monolithic entity having relatively thin extension areas 72 that are spaced away from one another. The extension areas 72 contact and deform against the inner wall of the valve seat (in the case of a monolithic plug) or the outer wall of the plug 70 (in the case of a monolithic wall with extension areas).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example(s) chosen for purposes of disclosure and covers all changes and modifications which do not constitute departures from the true spirit and scope of this invention.

The invention claimed is:

1. A stem controlled valve, comprising:
a plurality of sealing discs,
a plurality of spacing discs, and
a valve seat having an inner seat wall and/or a valve plug having an outer wall,
wherein the plurality of sealing discs and the plurality of spacing discs are arranged as a stack with one or more spacing discs positioned between and directly adjacent single sealing discs or groups of the sealing discs of the plurality of sealing discs,
wherein sealing is by either configuration a) or b)
wherein in configuration a) the single or groups of sealing discs of the plurality of sealing discs in the stack have a larger diameter than both
i) a diameter of the one more spacing discs that are positioned between and adjacent the single sealing discs or groups of sealing discs, and ii) an inner diameter which extends between opposing sides of the inner seat wall, such that under a compressive pressure on the stack, portions of the sealing discs in the plurality of sealing discs abut against and elastically deform on the inner seat wall of the valve seat beyond an outer diameter of a respective directly adjacent spacing disc, or
wherein in configuration b) the single or groups of sealing discs of the plurality of sealing discs in the stack have openings that extend therethrough which have a smaller inner diameter than both
i) an inner diameter of openings which extend through each of the one or more spacing discs that are positioned between and adjacent the single sealing discs or groups of sealing discs, and
ii) a diameter of the outer wall of the valve plug such that under a compressive pressure on the stack, portions of the sealing discs in the plurality of sealing discs abut against and elastically deform on the outer wall of the valve plug beyond an inner diameter of a respective directly adjacent spacing disc.

2. The stem controlled valve of claim 1 wherein each of the plurality of sealing discs have a same diameter and each of the plurality of spacing discs have a same diameter.

3. The stem controlled valve of claim 1 wherein the diameter of the sealing discs and the diameter of the spacing discs each become progressively smaller from a bottom of the stack to the top of the stack.

4. The stem controlled valve of claim 1 wherein the diameter of the sealing discs and the diameter of the spacing discs each become progressively larger from a bottom of the stack to the top of the stack.

5. The stem controlled valve of claim 1 wherein the inner seat wall of the valve seat is cylindrical.

6. The stem controlled valve of claim 1 wherein the inner seat wall of the valve seat is conical.

7. The stem controlled valve of claim 1 wherein the inner seat wall is conically rounded.

8. The stem controlled valve of claim 1 wherein the outer wall of the valve plug is cylindrical.

9. The stem controlled valve of claim 1 wherein the outer wall of the valve plug is conical.

10. The stem controlled valve of claim 1 wherein sealing is by configuration a).

11. The stem controlled valve of claim 1 wherein sealing is by configuration b).

12. The stem controlled valve of claim 1 wherein a single spacing disc of the plurality of spacing discs is positioned between each pair of sealing discs of the plurality of sealing discs in the stack.

13. The stem controlled valve of claim 1 wherein the single or groups of sealing discs of the plurality of sealing discs are processed, at least at portions which extend beyond the spacing discs, to generate a plurality of void spaces in the at least portions which extend beyond the spacing discs sufficient for cryogenic pliability of the single or groups of sealing discs.

14. The stem controlled valve of claim 13 wherein the plurality of void spaces is formed by pre-stressing the at least portions of the single or groups of sealing discs by deforming the at least portions of single or groups of sealing discs.

15. The stem controlled valve of claim 14 wherein pre-stressing is performed in the stem controlled valve at a pressure which exceeds a valve set pressure.

16. The stem controlled valve of claim 14 wherein deforming is performed at room temperature.

* * * * *